March 5, 1963    G. M. WALKER    3,080,185
QUICK COUPLER
Filed Oct. 21, 1960

INVENTOR.
GARY M. WALKER
BY
ATTORNEY

United States Patent Office 3,080,185
Patented Mar. 5, 1963

3,080,185
QUICK COUPLER
Gary M. Walker, Richardson, Tex., assignor to Collins Radio Company, Cedar Rapids, Iowa, a corporation of Iowa
Filed Oct. 21, 1960, Ser. No. 64,155
1 Claim. (Cl. 287—104)

This invention relates in general to shaft couplers, and in particular to apparatus for detachably connecting driven and driving shafts.

It is sometimes necessary to join a couple of shafts so that they may be quickly connected and disconnected while obtaining accurate indexing.

It is an object of this invention, therefore, to provide an improved apparatus for allowing a pair of shafts to be detachably connected, while providing an accurate index.

Another object of this invention is to provide a quick disconnect for a pair of shafts.

A feature of this invention is found in the provision for a pair of shafts with a first shaft formed with a flatted side and a coupling member attached to the second shaft and movable longitudinally thereof and formed with an opening adapted to receive the flatted shaft.

Further features, objects, and advantages will become apparent from the following description and claims when read in view of the accompanying drawings, in which:

Figure 1:
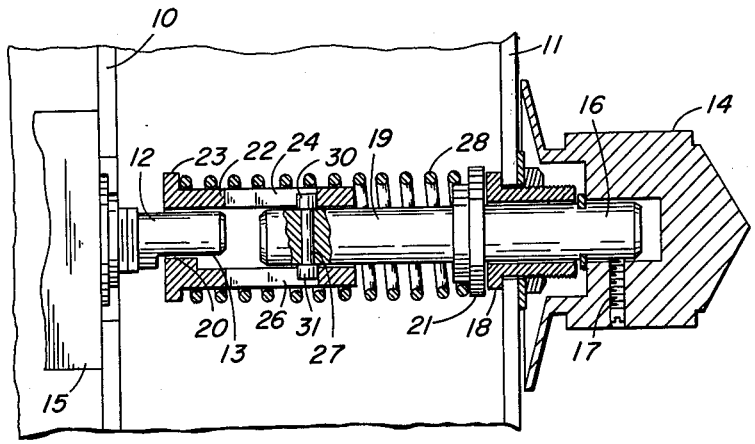
FIGURE 1 illustrates a section of the shaft coupler according to this invention with the shafts connected together.

FIGURE 1 illustrates a first plate 10 which might comprise, for example, a portion of the chassis of the radio and which has attached to it a controlled element 15. Controlled element 15 has an output shaft 12 which has a portion 13 that has been flatted by removing a portion of the material.

The chassis 10 is connected to the plate 11 by suitable holding means, not shown. A knob 14 is rotatably supported by a shaft 16 which extends through the plate 11. A set screw 17 locks the knob 14 to the shaft 16. The shaft 16 extends through a bearing 18 mounted in the plate 11 and is formed with a shoulder. A portion 19 of the shaft 16 extends toward the plate 11 and has an enlarged portion 21 adjacent the member 18. A coupling member 22 is formed with an enlarged shoulder 23 and has a central opening that is receivable over the shaft 19. Shaft 19 has an opening through which a locking pin 27 extends.

Portions 30 and 31 of the locking pin are received in slots 24 and 26 formed in the coupling member 22 so as to prevent the coupling member 22 from rotating relative to the shaft 19 while allowing it to move longitudinally within the limits allowed by slots 24 and 26. A spring 28 is under compression and is mounted between the enlarged portion 23 and the shoulder 21 so as to bias the coupling member 22 to the left relative to the figures.

FIGURE 1 illustrates the chassis 10 connected to plate 11 and with the coupling member 22 positioned so that the flatted portion 13 of shaft 12 is received into the opening 20 of the coupling member 22. In this condition motion of knob 14 will be transmitted through the shaft 16, coupling member 22, and shaft 12 to the control member 15. Coupling member 22 is biased to the full left position so that members 30 and 31 of the locking pin engage the right edges of slots 24 and 26.

Figure 2:
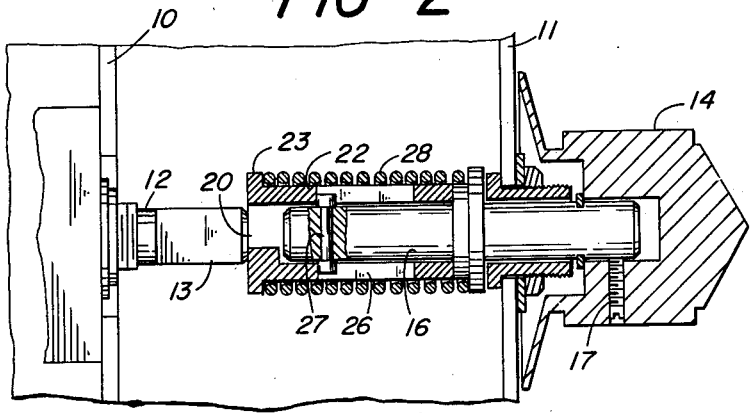
FIGURE 2 illustrates the shaft coupler of this invention before the coupling means has joined the shafts.

FIGURE 2 illustrates the condition when the chassis 10 has been removed from the plate 11 and then repositioned and locked together. In the condition shown, opening 20 of the coupling member 22 is not aligned with the flatted portion 13 of shaft 12 and the end of shaft 12 compresses the spring 28 and the shaft 16 is not coupled to the shaft 13. By rotating the knob 14 a position will be reached in which the flatted portion 13 will be in alignment with the opening 20 and will pass into the opening 20, thus allowing the members to assume the position shown in FIGURE 1. When this occurs the shaft 16 will be directly coupled to shaft 12 as shown in FIGURE 1.

Figures 3, 4:
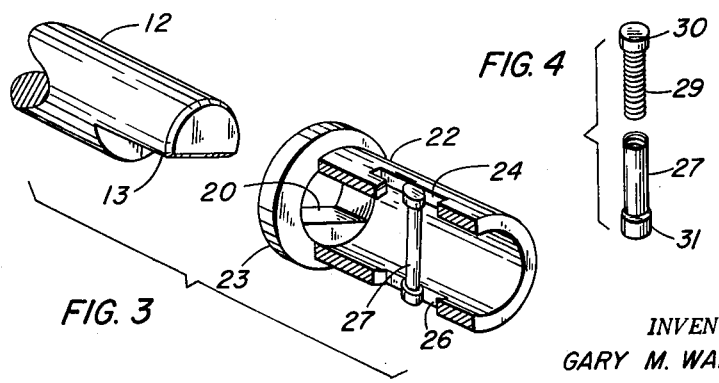
FIGURE 3 is an exploded partial section view of one shaft and the shaft coupler.
FIGURE 4 is a detailed view of the locking pin.

FIGURE 3 is an exploded view of the coupling member 22 and the shaft 12 and flatted portion 13.

FIGURE 4 illustrates the construction of the locking pin 27. It is noted that portion 31 has a hollow threaded portion in which a screw 29 is received. The head 30 of the screw 29 and enlarged portion 31 form the bearing surfaces for the coupling member 22.

It is seen that this invention provides means for quickly disconnecting a pair of shafts and quickly reconnecting them so that they are properly indexed.

Although the invention has been described with respect to a preferred embodiment, it is not to be so limited, as changes and modifications may be made which are within the scope of the appended claim.

What is claimed is:

A device for coupling a pair of shafts for common rotation, comprising: a rotatable first shaft having a free end portion of irregular shape; a rotatable second shaft substantially coaxially positioned with respect to the first and having an end portion adjacent to the free end portion of said first shaft; a sleeve with cross section slightly larger than said second shaft and mounted on said end portion of said second shaft; cooperating means on said shaft and sleeve constraining said sleeve to rotation with said shaft; said sleeve having a free end portion with an opening therein conforming to the irregular shape of the free end portion of said first shaft for receiving the same and coupling said shafts upon lonigtudinal movement of said sleeve toward said first shaft when said shafts are in predetermined rotational positions with respect to one another; and spring means connected to said sleeve for biasing the same for longitudinal movement away from said second shaft to assure coupling of said shafts when in said predetermined rotational positions, said sleeve being retracted onto said second shaft by longitudinal movement of one of said shafts toward the other whenever said shafts are not in said predetermined rotational positions, said sleeve and said first shaft being relatively moveable longitudinally away from one another while said shafts are coupled together whereby decoupling of said shafts can be accomplished.

References Cited in the file of this patent

UNITED STATES PATENTS

| 1,695,564 | Thomas | Dec. 18, 1928 |
| 2,327,951 | Zaleske | Aug. 24, 1943 |

FOREIGN PATENTS

| 623,519 | Great Britain | May 18, 1949 |